(No Model.) 10 Sheets—Sheet 2.

A. KIMBALL.
MACHINE FOR MAKING PIN TICKETS.

No. 457,782. Patented Aug. 18, 1891.

WITNESSES:
Edward Wolff
Jas. S. Eobault

INVENTOR:
ALONZO KIMBALL.
BY Francis C. Bowen
ATTORNEY.

(No Model.)  10 Sheets—Sheet 4.

A. KIMBALL.
MACHINE FOR MAKING PIN TICKETS.

No. 457,782.  Patented Aug. 18, 1891.

WITNESSES:
Edward Wolff
Jas. P. Ewbank

INVENTOR:
ALONZO KIMBALL.
BY Francis C. Bowen
ATTORNEY.

(No Model.) 10 Sheets—Sheet 5.
A. KIMBALL.
MACHINE FOR MAKING PIN TICKETS.
No. 457,782. Patented Aug. 18, 1891.
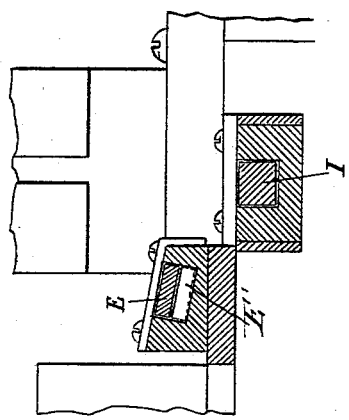
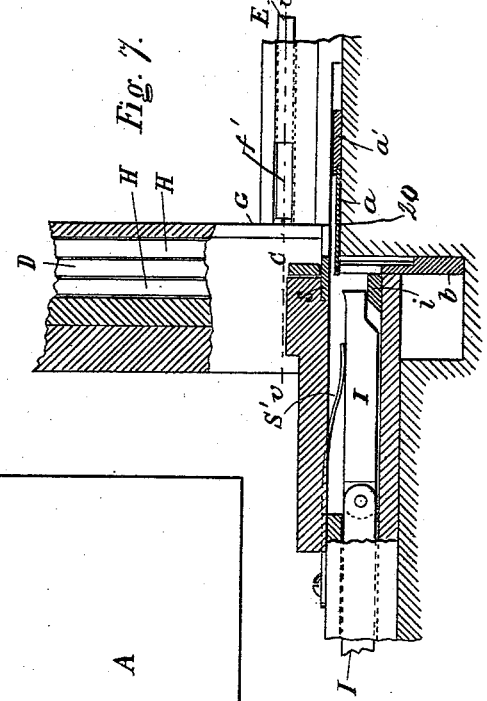
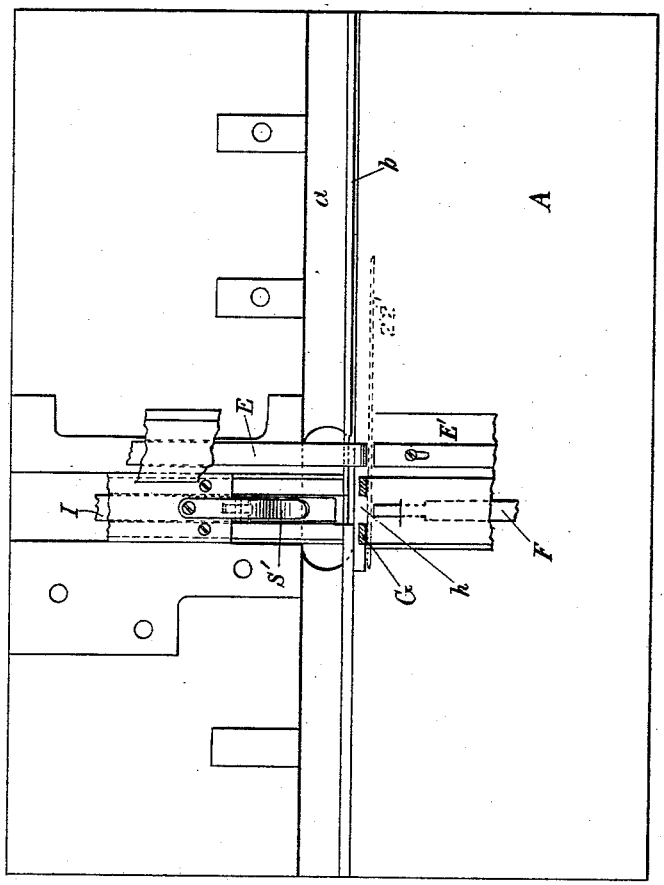
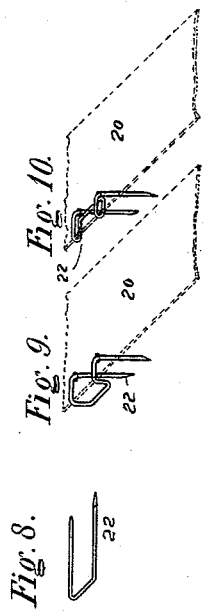
WITNESSES:
Edward Wolff
Jas. S. Enstants
INVENTOR:
ALONZO KIMBALL.
BY Francis C. Bowen
ATTORNEY.

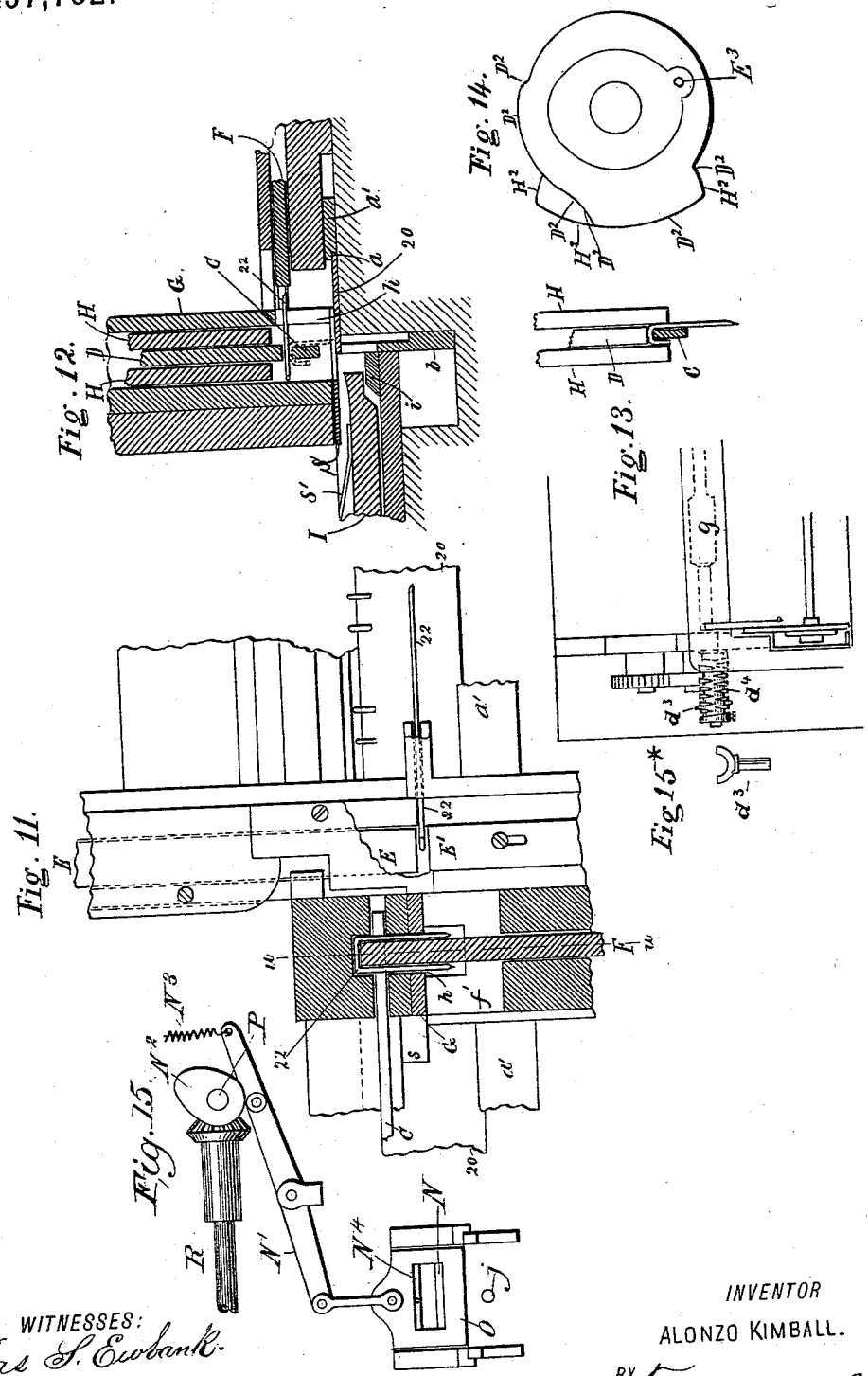

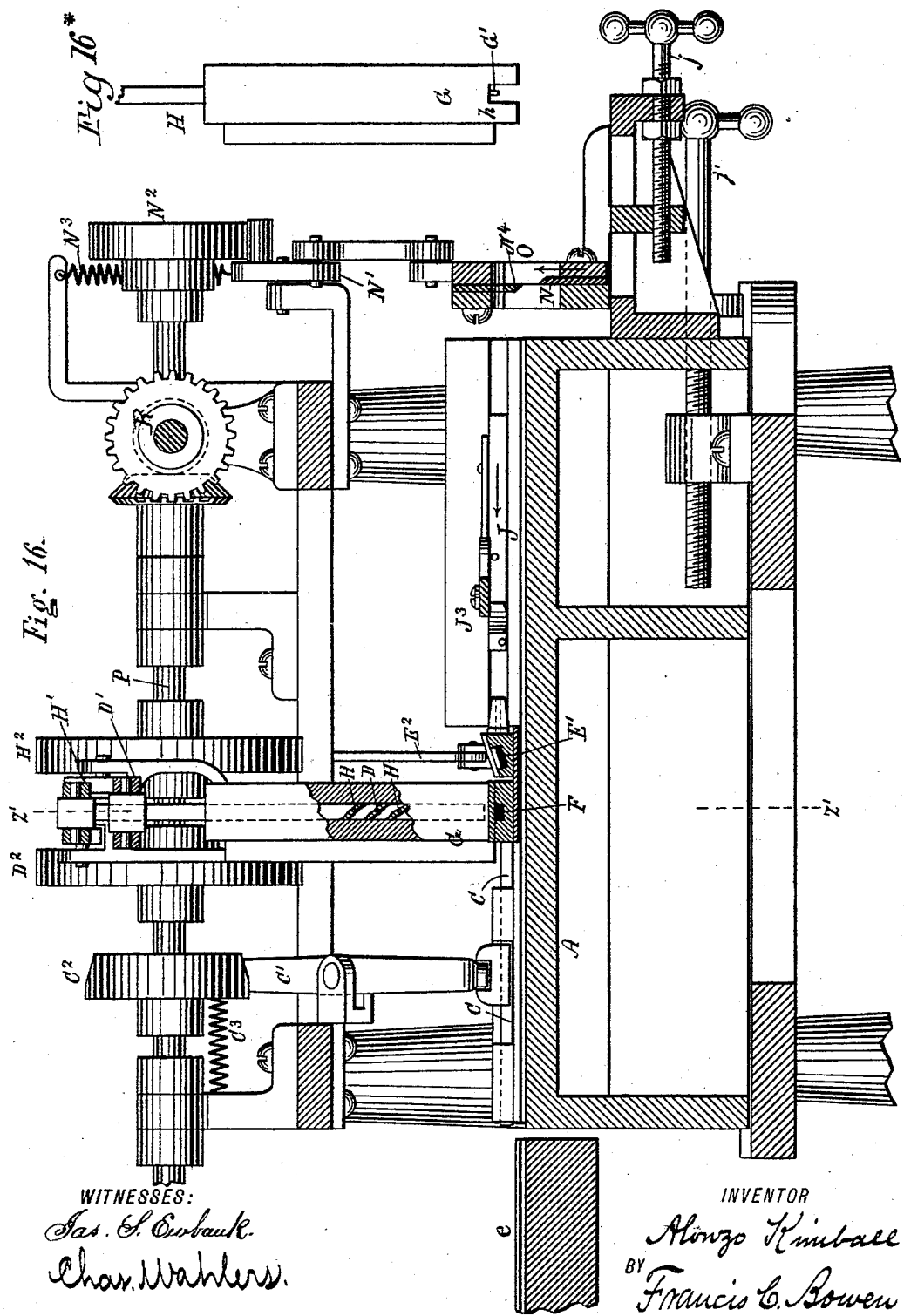

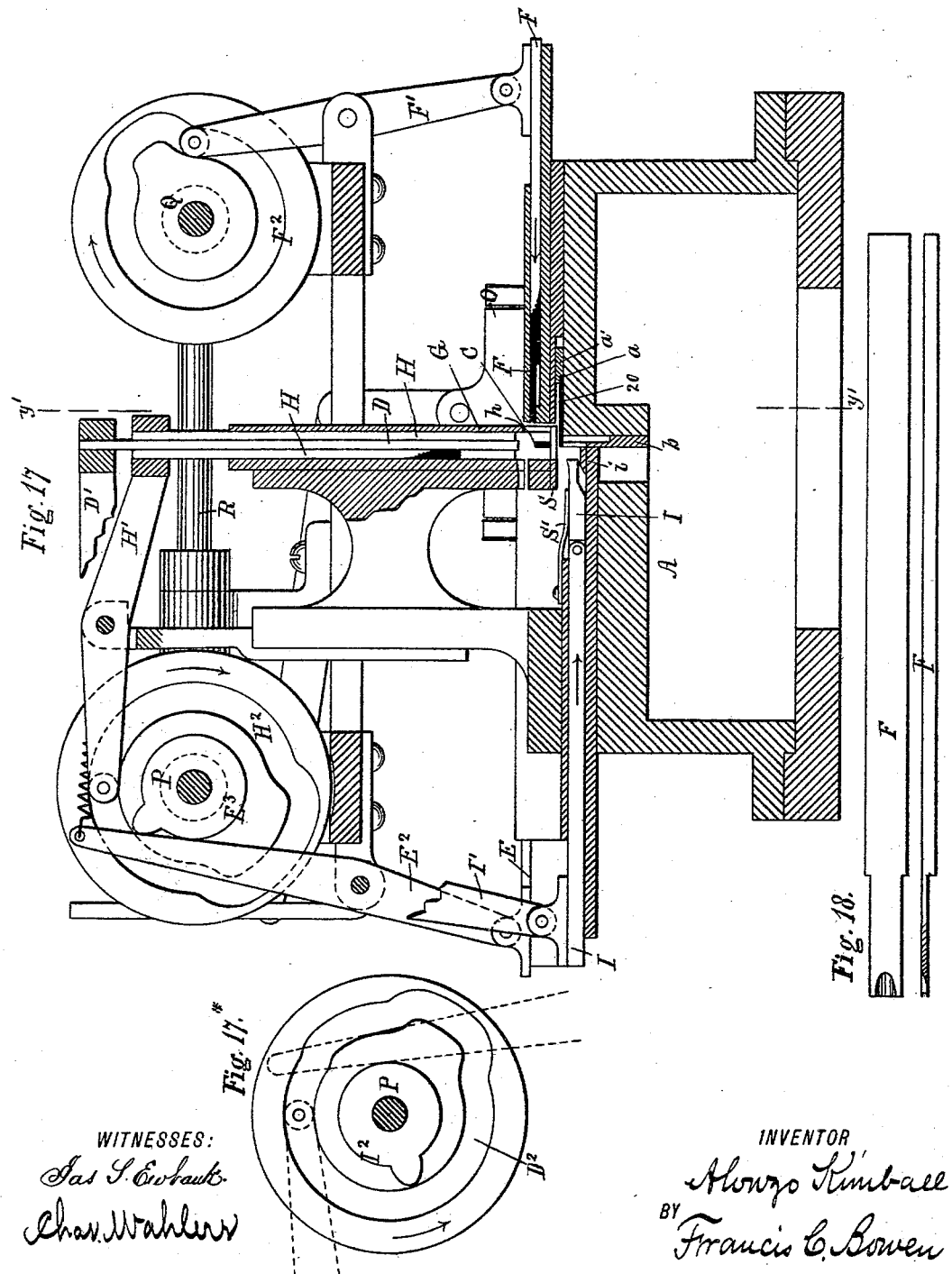

(No Model.)  10 Sheets—Sheet 9.
A. KIMBALL.
MACHINE FOR MAKING PIN TICKETS.

No. 457,782. Patented Aug. 18, 1891.

WITNESSES:
Jas. S. Ewbank.
Chas. Wahlers

INVENTOR
Alonzo Kimball
BY Francis C. Bowen
ATTORNEY (No Model.) 10 Sheets—Sheet 10.
A. KIMBALL.
MACHINE FOR MAKING PIN TICKETS.

No. 457,782. Patented Aug. 18, 1891.

WITNESSES:
Jas. S. Ewbank.
Chas. Wahlers

INVENTOR
Alonzo Kimball
BY Francis C. Bowen
ATTORNEY

500
UNITED STATES PATENT OFFICE.

ALONZO KIMBALL, OF NEW YORK, N. Y.

MACHINE FOR MAKING PIN-TICKETS.

SPECIFICATION forming part of Letters Patent No. 457,782, dated August 18, 1891.

Application filed November 19, 1886. Serial No. 219,410. (No model.)

*To all whom it may concern:*

Be it known that I, ALONZO KIMBALL, a citizen of the United States, and a resident of New York, in the county of New York and State of New York, have invented certain new and useful Improvements in Machines for Making Pin-Tickets, of which the following is a specification.

My invention relates to the manufacture by machinery of pin tickets or tags for attachment to articles of merchandise, and especially that class of such tickets in which the ends of a pin of staple form are inserted in the card-board composing the ticket near one edge thereof and the loop of the staple bent over and around said edge of the card for effecting a connection of said pin with the card, as more particularly described in Letters Patent of the United States No. 340,061, dated April 27, 1886.

My invention consists in certain novel features of construction hereinafter described, whereby a strip of card-board may be printed to produce a series of tickets and a series of pins, connected, successively, to one or both edges of said strip in proper relation to the printed tickets and the strip cut at proper points for separating the tickets from each other in one continuous operation.

The machine used in carrying out my invention is illustrated in the accompanying drawings, in which—

Figure 1:
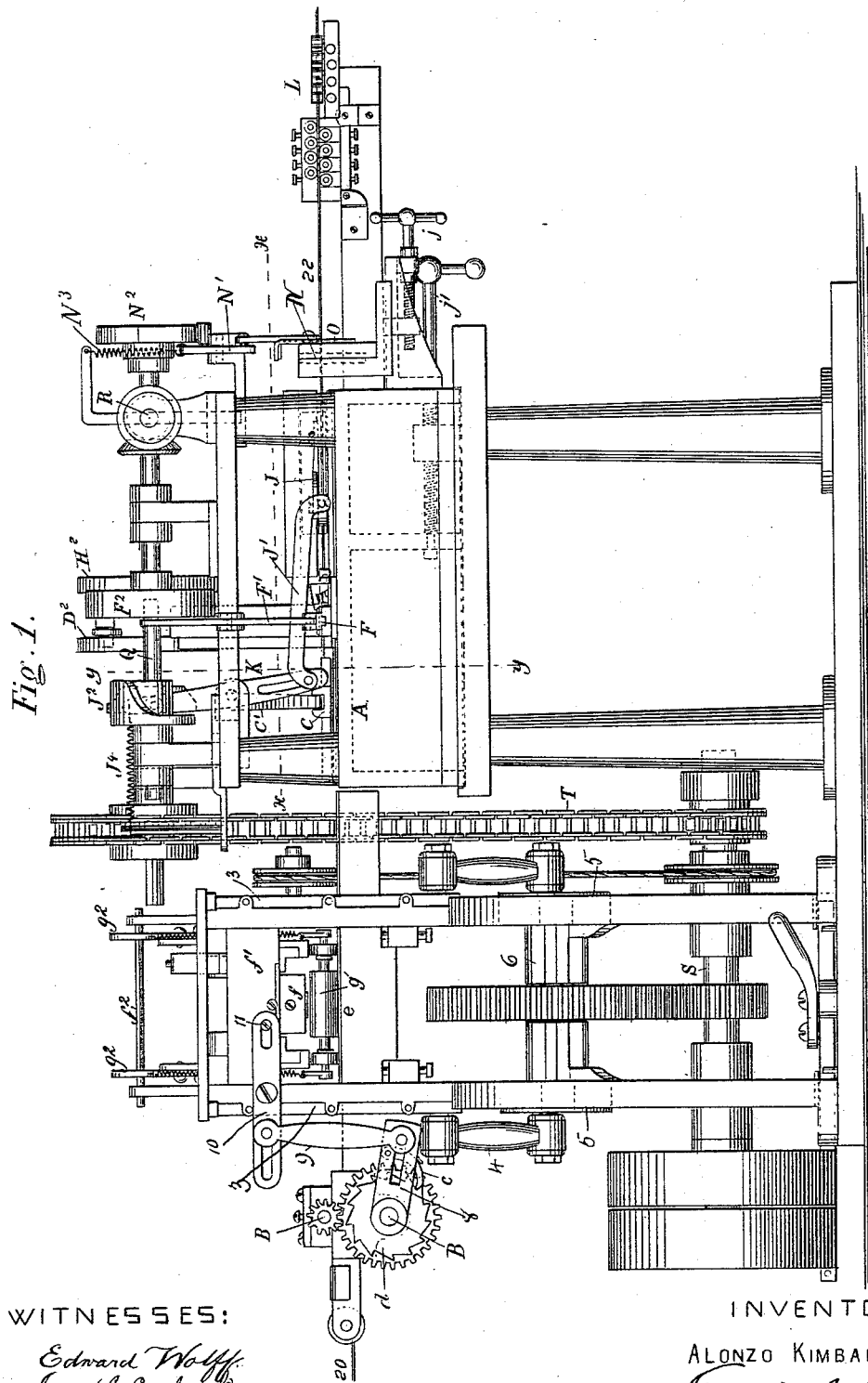
Figure 2:
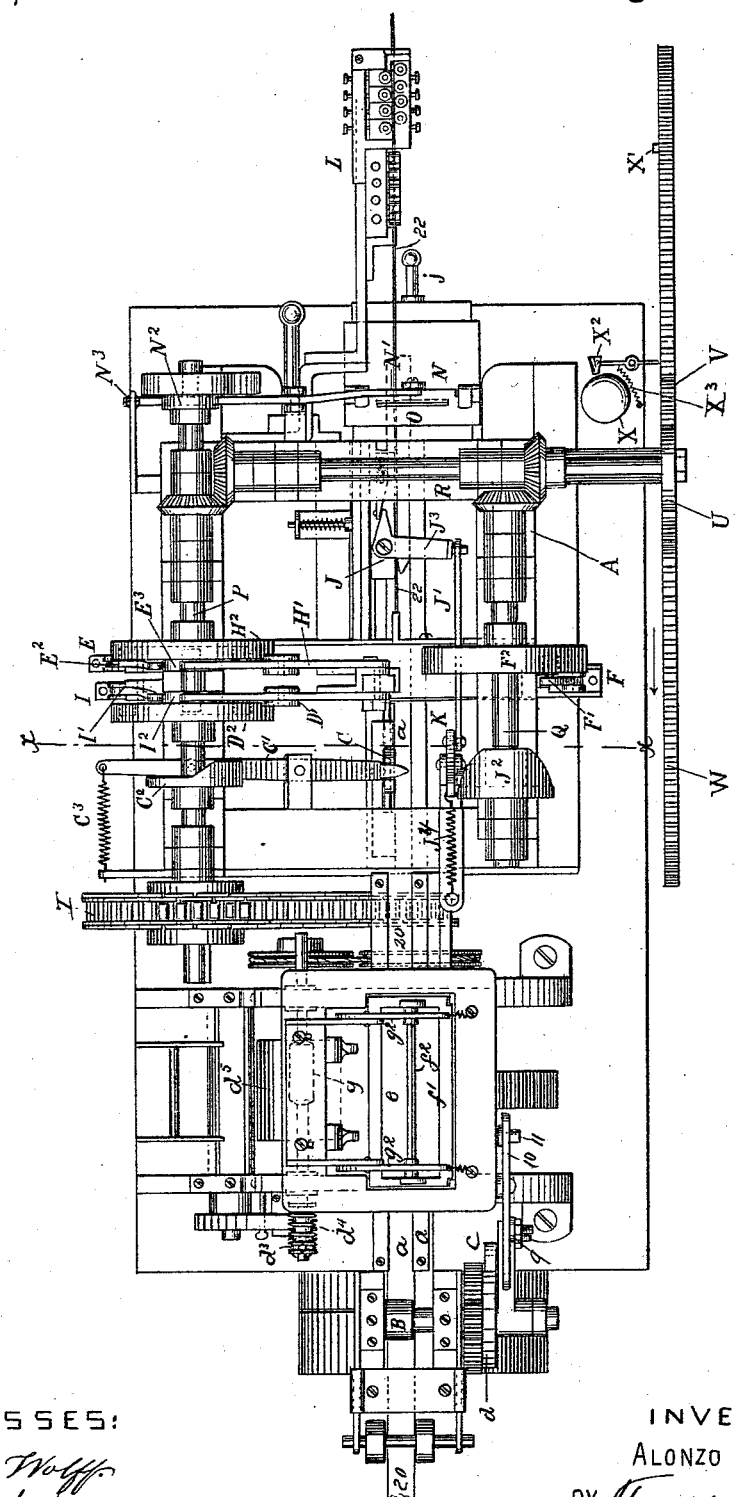
Figure 3:
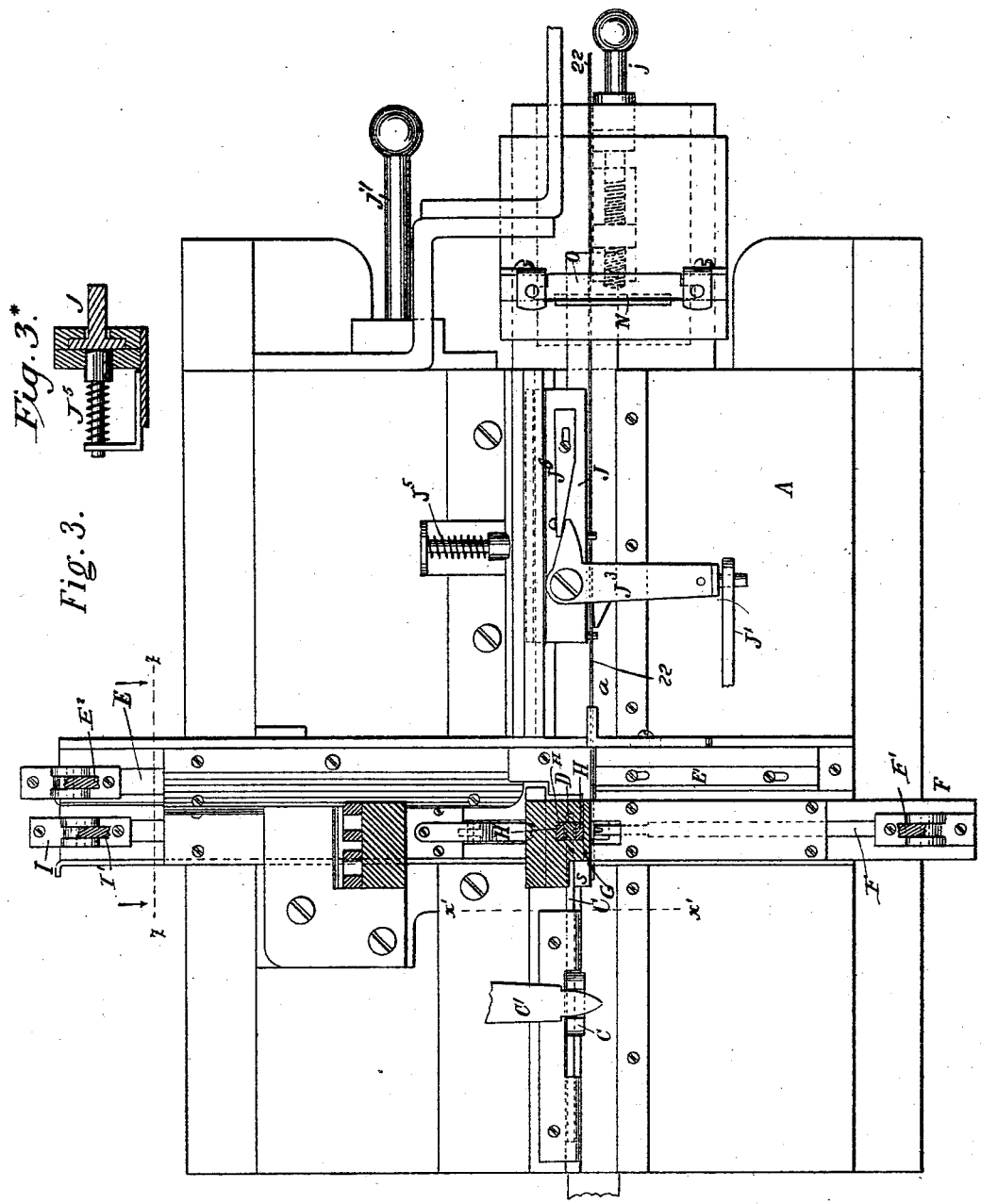
Figure 4:
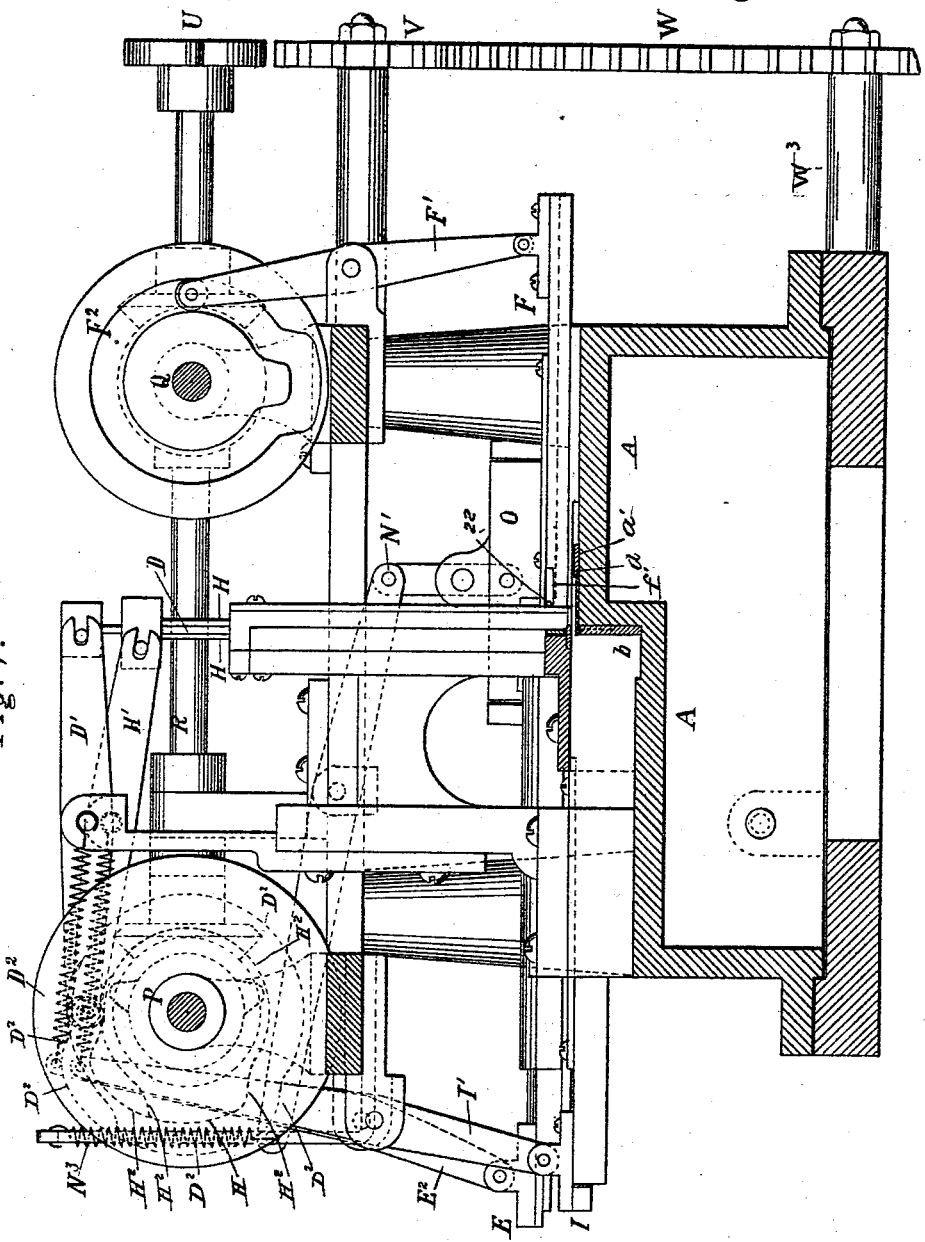
Figure 19:
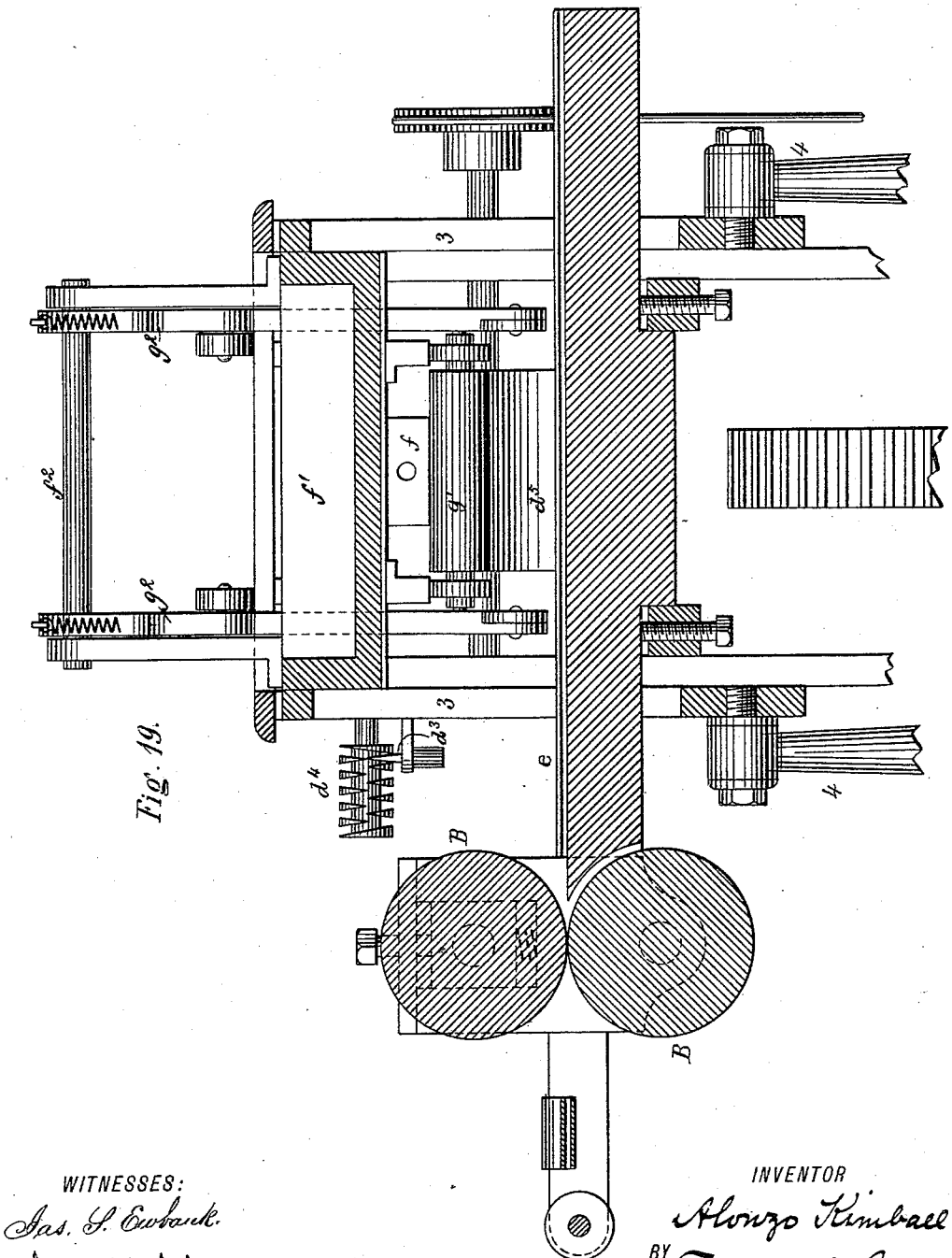
Figure 20:
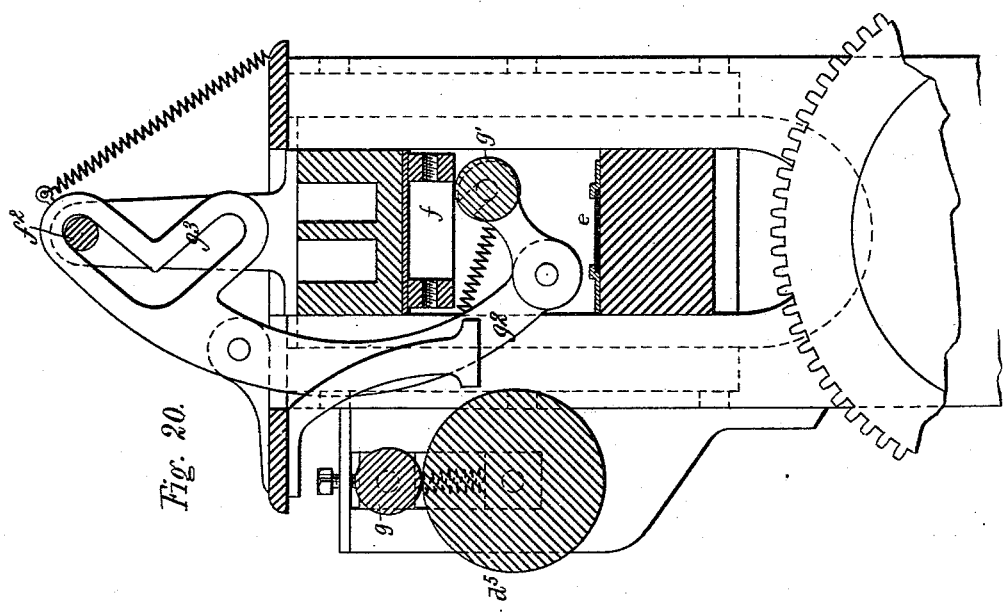

Figure 1 represents a side view. Fig. 2 represents a plan or top view, including a registering mechanism. Fig. 3 represents a horizontal section on line $x$ $x$, Fig. 1, and on a larger scale than said figure. Fig. 3* represents a cross-section of the wire-feeder and concomitant parts. Fig. 4 represents a cross-section on line $y$ $y$, Fig. 1, and $x$ $x$, Fig. 2, including the registering mechanism. Fig. 5 is a detail cross-section on line $z$ $z$, Fig. 3. Fig. 6 is a plan view of the bed-plate detached. Fig. 7 is a detail section on line $x'$ $x'$, Fig. 3. Figs. 8, 9, and 10 are views of the pin-ticket. Fig. 11 is a section on the line $v$ $v$, Fig. 7, when the die F is in action. Fig. 12 is a section on the line $w$ $w$ of Fig. 11, when the die F is withdrawn. Fig. 13 is a detail view showing the loop and the ends of the staple bent down and held between plungers H and D and holder or former C. Fig. 14 shows a diagram of the cams $D^2$ and $H^2$. Fig. 15 is a detail view of the ticket-cutting mechanism. Fig. 15* represents a plan view of portion of the printing mechanism. Fig. 16 represents a vertical longitudinal section of the pin forming and attaching mechanism on the line $y'$ $y'$, Fig. 17. Fig. 16* represents a front view of a fixed pin-forming die. Fig. 17 represents a cross-section on the line $z'$ $z'$, Fig. 16. Fig. 17* represents a face view of cam $D^2$. Fig. 18 represents a plan and side view of a movable pin-forming die. Fig. 19 represents a vertical longitudinal section of the printing mechanism. Fig. 20 represents a cross-section thereof.

Similar letters of reference indicate corresponding parts.

The letter A designates the bed-plate of that part of the machine which forms and attaches the staple, said bed-plate having a raised portion, as shown in Figs. 7, 11, and 17, with a groove $a$ thereon formed by a strip $a'$ constituting a guide to keep the strip of card-board from which the tickets are to be cut in position in the machine, said groove being adjacent to the inner edge of said raised portion of the plate, and a step or plate $b$ being secured to said edge to form a channel in which the ends of the pin are suspended and travel after the pin has been connected to the strip. Two strips $a$ are provided, forming two grooves to serve as a guide for the ticket-strip on that part of the machine which prints the ticket, while there is but one strip and therefore but one groove on that part of the machine which forms and attaches the staple. The strip of card-board 20 is introduced into said grooves $a$ from one end thereof and is advanced at proper intervals by means of feed-rollers B, between which it passes and to which an intermittent revolving motion is imparted, as by means of a pawl $c$ and ratchet $d$, Figs. 1 and 2, the latter being fixed to the shaft of one of said rollers and the two rollers being geared together by suitable cog-wheels, the strip being printed and the pin being connected thereto between the intervals of motion of the strip.

The printing mechanism is arranged in advance of the pin forming and attaching mechanism, and may be of any suitable construction, the essential features thereof being a platen $e$, Figs. 1 and 2, a chase $f$, mounted on a vertically-reciprocating bed or carriage $f'$ above the platen, an inking-roller $g'$, Figs. 2, 19, and 20, an ink-supply cylinder $d^5$, and an ink-distributing roller $g$, arranged in superficial contact with said cylinder, and to receive a longitudinally-vibrating motion from a yoke $d^3$ on the machine-frame, engaging a right and left hand screw $d^4$ on one end of the roller-shaft, said inking-roller being arranged to travel over the face of the type or other matter in the chase toward and from the supply-cylinder at proper intervals, so that the strip is printed with successive tickets, to be subsequently separated from each other.

To the carriage $f'$ are connected the upper ends of slides 3 3, Figs. 1 and 19, the lower ends of which are connected by pitmen 4 to cranks 5, carried by a horizontal shaft 6, which receives motion from the main shaft S, so that as the crank-shaft 6 revolves, the crank-wheels, pitmen, and yokes give the necessary rising and falling motion to the chase $f$, together with its carriage.

The inking-roller $g'$ receives its motion from two levers $g^2$ in which it is mounted and which engage a bar $f^2$, attached to uprights on the bed $f'$ by means of a slot $g^3$, Fig. 20, formed in each of said levers, so that the latter are operated from and simultaneously with the bed, the levers having their fulcra in pivots on the machine-frame. A revolving motion is imparted to the ink-supply cylinder $d^5$ from the main shaft S by a belt and pulley, as shown in Figs. 1, 2, and 19, or by other suitable means. The pawl $c$ is carried by an arm 8, which is hung on the shaft of the lower feed-roller B and connected by a rod or link 9 with one arm of a lever 10, having its fulcrum on the machine-frame and its other arm engaging with a pin 11 on the bed to be operated therefrom.

The pins are made from a strand of wire 22, which is introduced into the machine from an opposite direction to the blank strip of card-board and the leading end of which is first cut off to the proper length, it being received in recesses or slits, Figs. 7 and 11, formed in the sides of a box forming a guide for a die F, by which it is bent into the form of a staple, as hereinafter more fully described. The pin forming and attaching mechanism is located above the bed-plate A, and is composed of a movable support C, (best seen in Figs. 16 and 17,) acting also as a former, a vertically-reciprocating holder or plunger D arranged to engage the wire resting on the support or former, transverse cutters E E', one fixed and the other movable, dies F G, arranged in proper relation to each other to bend the pin-blank into a staple form, one being fixed and the other movable horizontally of the machine, vertically-reciprocating plungers H H, arranged to bend the staple downward on opposite sides of the support, and of a horizontally-reciprocating plunger I, arranged to bend the loop of the staple under or around the strip.

The fixed die G is provided with a slot or recess $h$, Figs. 6, 7, 11, 12, and 16*, into which the piece of wire constituting the pin-blank is forced by the action of the other die for imparting to the wire a staple form, and the position of the transverse plunger I is opposite to said dies, so that it is adapted to properly engage the loop of the staple for bending it under the strip of card-board, the operation of said forming and attaching mechanism being as follows: When the leading end or portion of the wire has reached a position opposite the dies F G, the movable cutter E approaches the stationary cutter E', thereby cutting off a proper length of wire to form the desired pin, the pin-blank thus obtained projecting to an equal distance on each side of said dies, causing the middle of the blank to face the slot or recess $h$ of the fixed die. The movable die F now advances and forces the pin-blank into or through the fixed die G, thereby imparting to the blank a staple form, as shown in Figs. 8 and 11, the staple resting on the horizontal support C, as shown also in Fig. 12. The plunger D now descends upon the staple, holding it firmly in contact with the support C, and when this has been accomplished the plungers H H descend and force the staple downward over the sides of said support with the loops on one side and its ends on the other side of the support, as shown in Fig. 13. The horizontal support C now recedes from under the staple, thereby freeing it, and the vertical plunger D continues to descend, forcing the staple from between the vertical plungers H H and causing its points to pass through the strip of card-board 20, resting on the bed of the machine, while the loop of the staple is at the same time brought next to one edge of said strip, as shown in Fig. 9. The horizontal plunger I then advances and forces the loop of the staple under the strip of card-board, as shown in Fig. 10, thereby completing its attachment, the strip being thereupon advanced to bring another portion thereof in position to receive a pin. In the operation of said horizontal plunger I the end thereof comes in contact with a wedge $i$, (see Figs. 7 and 12,) fixed to the bed-plate, and is thereby forced slightly upward with the effect of bringing the loop of the staple in close contact with the back of the strip and between the prongs of the staple for locking the staple on the card.

In the operation of the horizontal plunger I the strip of card-board, together with the pin, is sustained by means of an abutment $s$, Figs. 7, 12, and 17, which receives the upward thrust or pressure of said plunger, said abutment being fixed to the lower end of a box forming a guide for the plungers D H H and cut away to afford a suitable passage to said plungers, and in order to permit the plunger to ride upward on the wedge $i$ it is jointed at a point near the end, the loose end or portion thereof being exposed to the action of a spring $s'$, having a tendency to force it downward and hold the same in a normal position.

In order to adapt the vertical plungers H H to the required purpose, they are arranged on opposite sides of the movable support C with the vertical plunger D between them—namely, in the vertical plane of the movable support. The cutters E E' are inclined, as shown in Figs. 5 and 11, for the purpose of imparting to both ends of the wire pin-blank a sharp point.

The strand of wire, like the strip of card-board, is fed to the machine at the proper intervals by means of a feeder J, Figs. 1, 2, and 3, to which a reciprocating motion is imparted by means of a lever K, the wire being drawn between rollers L, arranged in rear of said feeder for the purpose of straightening it. The feed motion of the strip of card-board is so adjusted in relation to the operation of the vertical plungers D H and horizontal plunger I that the pins are connected to the strip of card-board at points opposite the respective tickets printed on the strip, and when the pins have been connected to the strip the latter is cut at points intermediate of the printed tickets for the purpose of separating the latter from each other, the cutting operation being effected by means of a vertically-reciprocating knife N, Figs. 1, 2, 15, and 16, arranged adjacent to the rear end of the bed-plate A in a suitable carriage $o$, which with its connections is adjustable within certain limits in relation to the bed-plate, thereby permitting the knife to be set according to the feed motion for cutting tickets of different sizes, said carriage being secured in the desired position by means of a set-screw $j$, working in a bracket $j^2$, which is suitably attached to the machine-frame, adjacent to which is a second set-screw $j'$ for adjusting the bed-plate A on its support.

Motion is imparted to the parts from either of two shafts P, Q, Figs. 2 and 4, geared together by a cross-shaft R, and one geared with a driving-shaft S, Fig. 1, as by means of a chain T, as follows: The motion of the movable support C is produced by means of a lever C', Figs. 2, 3, and 16, one arm of which engages with the support and the other arm with a cam $C^2$ of the shaft P, and to which is connected a spring $C^3$, Fig. 2, so that an oscillating motion is imparted to said lever in one direction by means of the cam and in the other direction by means of the spring. The motion of the movable cutter E is produced by means of a vertical lever $E^2$, Figs. 2 and 4, one arm of which engages with the cutter-stock and the other arm with a cam $E^3$ of the shaft P, while the motion of the horizontal plunger I is produced by means of a lever I', (see Figs. 2 and 4,) one arm of which engages with said plunger and the other arm with a cam $I^2$ of the shaft P, both cams $E^3 I^2$ being constructed to impart an oscillating motion in both directions to the levers I' and $E^2$, respectively. The motion of the movable die F is produced by means of a vertical lever F", (see Figs. 1, 2, and 4,) one arm of which engages with said die and the other arm with a cam $F^2$ of shaft Q in a proper manner to receive an oscillating motion in both directions from said cam. The motion of the vertical holder and plunger D and vertical plungers H H is produced by means of vertical levers D' H', Figs. 2, 4, and 17, one arm of which engages with said plungers, respectively, and the other arm with a cam $D^2 H^2$ of the shaft P, whence said levers derive an oscillating motion in both directions. The connections between the levers F", I', and $E^2$ and the respective slides which they operate are similar to that between the lever D' and the plunger D. The motion of the feeder J is produced, as before stated, by means of a lever K, one arm of which is connected to the feeder by means of a link J', Figs. 1, 2, and 3, and the other arm of which engages with a cam $J^2$ of the shaft Q, to receive an oscillating motion in one direction from said cam and in the other direction from a spring $J^4$, said link J' being attached at the proper end to a jaw $J^3$, Figs. 2, 3, and 16, pivoted on the feeder in such a manner as to clamp the strand of wire in the forward motion of the feeder and release the wire in the rearward motion of the feeder. In said rearward motion of the feeder J the pivoted jaw $J^3$ abuts against a stop $J^6$, adjustably secured on the feeder by means of a toe on said jaw, as shown in Figs. 2 and 3, and in order to retain the feeder in its guideways it is connected with a spring-rod $J^5$. As to this feature, however, no claim is made in the present application. The motion of the ticket-separating knife N is produced by means of a lever N', Figs. 1, 2, and 15, one arm of which is connected to the knife-carriage O and the other arm of which engages with a cam $N^2$ of the shaft P to receive an oscillating motion therefrom in one direction, the motion thereof in the opposite direction being produced by means of a spring $N^3$, connected to its free end. Said movable knife N co-operates with a stationary knife $N^4$, (best seen in Fig. 16,) which is perforated, as shown, for the passage of the wire through it.

Fig. 14 shows a diagram of the cams $D^2 H^2$. The cam $D^2$ comes first in action to press the plunger D down for the purpose of holding the wire firmly against the top of the support C. Cam $H^2$ comes in action to press down the plunger H H for the purpose of bending the loop part and ends of the staple down over the sides of said support. The cam $D^2$ comes again in action to press the plunger D farther down in order to drive the staple down so that the ends will pass through the card-board and the loop part next to the edge of the card-board. The cam $E^3$ operates the lever $E^2$, which is connected with the movable knife or cutter E.

In Figs. 2 and 4 is shown a mechanism for registering the number of tickets produced on the machine, said registering mechanism consisting of wheels U V W, one mounted on the shaft R, and each provided with teeth of a number in fixed relation to the other, one of said wheels being also provided with a pin X', Fig. 2, serving to operate the hammer X² of an alarm X at certain intervals.

What I claim as new, and desire to secure by Letters Patent, is—

1. In a machine for making pin-tickets, the combination, substantially as hereinbefore described, of a platen and vertically-reciprocating bed carrying a chase for printing a blank strip of card-board to represent a series of tickets, a movable support for the pin-blank, vertical plungers adapted to bend the ends and the loop, respectively, of a staple-shaped pin resting on said support downward on opposite sides of the support and to force said ends through the strip of card-board in proper relation to the printed tickets, a horizontal plunger adapted to bend the loop of the staple under or around the edge of said strip, and feed-rollers for presenting the strip of card-board to both said printing devices and pin-attaching devices.

2. In a machine for making pin-tickets, the combination, substantially as hereinbefore described, of cutters adapted to act on the strand of wire for producing the pin-blank, dies to bend said blank into the form of a staple, a movable support for said blank, vertical plungers adapted to bend the ends and the loop, respectively, of the staple downward on opposite sides of the support and to force said ends through a strip of card-board, a horizontal plunger adapted to bend the loop of the staple under or around the edge of said strip, and feed mechanism for the strip of card-board, for the purpose set forth.

3. In a machine for making pin-tickets, the combination, substantially as hereinbefore described, of a horizontally-reciprocating feeder for a strand of wire, cutters adapted to act on said strand for producing the pin-blank, dies operated to bend said blank into the form of a staple, a movable support for said blank, vertical plungers adapted to bend the ends and the loop, respectively, of the staple downward on opposite sides of the support and to force said ends through the strip of card-board, a horizontal plunger adapted to bend the loop of the staple under or around said strip, and feed-rollers operated to present the strip of card-board to said pin forming and attaching devices from an opposite direction to the strand of wire.

ALONZO KIMBALL.

Witnesses:
FRANCIS C. BOWEN,
HENRY VALK.